(12) United States Patent
Ullmann et al.

(10) Patent No.: US 11,107,481 B2
(45) Date of Patent: Aug. 31, 2021

(54) LOW-COMPLEXITY PACKET LOSS CONCEALMENT FOR TRANSCODED AUDIO SIGNALS

(71) Applicant: Dolby Laboratories Licensing Corporation, San Francisco, CA (US)

(72) Inventors: Raphael Marc Ullmann, Sunnyvale, CA (US); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 279 days.

(21) Appl. No.: 16/379,479

(22) Filed: Apr. 9, 2019

(65) Prior Publication Data

US 2019/0311723 A1 Oct. 10, 2019

Related U.S. Application Data

(60) Provisional application No. 62/655,091, filed on Apr. 9, 2018.

(30) Foreign Application Priority Data

Jun. 28, 2018 (EP) .................................... 18180399

(51) Int. Cl.
| | |
|---|---|
| *G10L 19/005* | (2013.01) |
| *G10L 19/022* | (2013.01) |
| *G10L 19/16* | (2013.01) |
| *H04L 29/06* | (2006.01) |
| *G10L 19/02* | (2013.01) |

(52) U.S. Cl.
CPC .......... *G10L 19/005* (2013.01); *G10L 19/022* (2013.01); *G10L 19/0212* (2013.01); *G10L 19/167* (2013.01); *G10L 19/173* (2013.01); *H04L 65/403* (2013.01); *H04L 65/607* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 7,596,489 B2 * | 9/2009 | Kovesi | G10L 19/005 704/219 |
| 7,869,992 B2 * | 1/2011 | Raifel | G10L 19/005 704/219 |

(Continued)

*Primary Examiner* — Jonathan C Kim

(57) ABSTRACT

Systems and methods are described for concealing packet loss in a received audio stream. Packets of the audio stream may be received in a non-lapped transform domain format, where at least one packet is missing in the stream. The received packets are decoded, and each missing packet in the decoded stream is replaced by a reduced-energy signal block. Each reduced-energy signal block may also be modified at a beginning or ending boundary, and shifted such that a start or end of each missing packet does not coincide with a peak of a transform window of a lapped transform domain format. The raw audio signal may then be encoded into transform windows having the lapped transform domain format. Packet loss concealment may then be performed for selected transform windows that include modified reduced-energy blocks, either prior to transmission or after transmission by the receiving endpoint.

19 Claims, 5 Drawing Sheets

(56) References Cited

U.S. PATENT DOCUMENTS

| | | | | |
|---|---|---|---|---|
| 8,089,992 | B2* | 1/2012 | Chen | H04L 43/087 370/516 |
| 8,214,201 | B2* | 7/2012 | Sun | G10L 19/005 704/207 |
| 8,355,911 | B2* | 1/2013 | Zhan | G10L 19/005 704/228 |
| 8,620,644 | B2* | 12/2013 | Ryu | G10L 19/005 704/201 |
| 9,325,544 | B2* | 4/2016 | Fazeldehkordi | H04L 25/4927 |
| 9,514,756 | B2* | 12/2016 | Naslund | G10L 19/025 |
| 9,911,432 | B2* | 3/2018 | Kaniewska | G10L 19/12 |
| 9,916,833 | B2* | 3/2018 | Schnabel | G10L 19/002 |
| 9,985,660 | B2* | 5/2018 | Mani | H04L 47/626 |
| 9,985,855 | B2* | 5/2018 | Dickins | H04L 43/0829 |
| 2002/0007273 | A1* | 1/2002 | Chen | G10L 19/022 704/229 |
| 2003/0035384 | A1* | 2/2003 | Cline | H04B 3/23 370/286 |
| 2004/0120309 | A1* | 6/2004 | Kurittu | G10L 21/04 370/352 |
| 2004/0252700 | A1* | 12/2004 | Anandakumar | H04L 29/06027 370/395.21 |
| 2005/0044471 | A1* | 2/2005 | Chia | H04L 47/2416 714/776 |
| 2005/0058145 | A1* | 3/2005 | Florencio | H04N 21/4398 370/412 |
| 2006/0184861 | A1* | 8/2006 | Sun | G10L 21/04 714/776 |
| 2006/0209955 | A1* | 9/2006 | Florencio | G10L 19/0212 375/240.12 |
| 2008/0151769 | A1* | 6/2008 | El-Hennawey | H04L 65/80 370/252 |
| 2008/0212567 | A1* | 9/2008 | El-Hennawey | H04L 65/80 370/352 |
| 2008/0243277 | A1* | 10/2008 | Kadel | G10L 19/0018 700/94 |
| 2008/0294428 | A1* | 11/2008 | Raifel | G10L 19/005 704/219 |
| 2010/0094642 | A1* | 4/2010 | Zhan | G10L 19/005 704/500 |
| 2010/0125452 | A1* | 5/2010 | Sun | G10L 25/90 704/208 |
| 2011/0022924 | A1 | 1/2011 | Malenovsky | |
| 2011/0196673 | A1* | 8/2011 | Sharma | G10L 19/005 704/207 |
| 2012/0013937 | A1* | 1/2012 | Ashmore | H04L 47/18 358/1.15 |
| 2012/0265523 | A1* | 10/2012 | Greer | G10L 19/002 704/201 |
| 2013/0109358 | A1* | 5/2013 | Balasubramaniyan | H04L 43/0829 455/411 |
| 2013/0230108 | A1 | 9/2013 | Leannec | |
| 2014/0119478 | A1* | 5/2014 | Fazeldehkordi | G10L 19/005 375/341 |
| 2014/0278418 | A1* | 9/2014 | Chen | G10L 19/005 704/246 |
| 2015/0207710 | A1* | 7/2015 | Dickins | H04L 47/30 370/252 |
| 2015/0319212 | A1* | 11/2015 | Mani | H04L 65/608 370/352 |
| 2015/0332704 | A1* | 11/2015 | Sun | H04B 3/23 704/227 |
| 2015/0348546 | A1* | 12/2015 | Sun | G10L 15/20 704/233 |
| 2015/0379998 | A1* | 12/2015 | Naslund | G10L 19/025 704/203 |
| 2016/0104487 | A1* | 4/2016 | Schnabel | G10L 19/22 704/219 |
| 2016/0148618 | A1* | 5/2016 | Huang | G10L 19/167 381/2 |
| 2019/0237086 | A1* | 8/2019 | Huang | H04L 1/0041 |
| 2019/0311723 | A1* | 10/2019 | Ullmann | G10L 19/173 |

* cited by examiner

LOW-COMPLEXITY PACKET LOSS CONCEALMENT FOR TRANSCODED AUDIO SIGNALS

CROSS-REFERENCE TO RELATED APPLICATION(S)

The present application claims priority to U.S. Provisional Patent Application No. 62/655,091 filed Apr. 9, 2018, and EP Patent Application No. 18180399.0 filed Jun. 28, 2018, both of which are incorporated herein by reference in its entirety.

TECHNICAL FIELD

Embodiments herein relate generally to audio signal processing, and more specifically to reducing audio distortion resulting from a loss of audio data packets in received signals that are transcoded to a lapped-transform domain signal using a low-complexity solution.

SUMMARY OF THE INVENTION

Systems and methods are described for concealing packet loss in a received audio stream. A server of a voice communication system may receive packets of an audio stream over a network connection. The received audio stream may be in a non-lapped transform domain format, and the packets may have a sequential order, where a block of packets is missing in the sequence. The block of packets includes at least one missing packet, and each packet may have a received window size of a predetermined time duration. The server may decode the received packets from the non-lapped format to a raw audio signal, and may replace each missing packet in the sequence with a reduced-energy signal block, such as a block of silence. The server may also modify each reduced-energy signal block at a beginning boundary and/or an ending boundary, and shift the raw audio signal, based on the received window size, by a predetermined delay such that a start or end of each missing packet does not coincide with a peak of a transform window of a lapped transform domain format.

After the shifting, the server may encode the raw audio signal into transform windows having the lapped transform domain format. Packet loss concealment may be performed for each transform window of the encoded audio signal that includes a modified reduced-energy signal block. After the encoding, the server may subsequently transmit the encoded audio signal to an endpoint. The packet loss concealment may be performed by the server prior to transmitting the encoded audio signal, or after the transmitting (i.e. by the endpoint, during the decoding process).

BRIEF DESCRIPTION OF THE FIGURES

This disclosure is illustrated by way of example and not limitation in the figures of the accompanying drawings, in which like references indicate similar elements, and in which.

DETAILED DESCRIPTION

Figure 1:
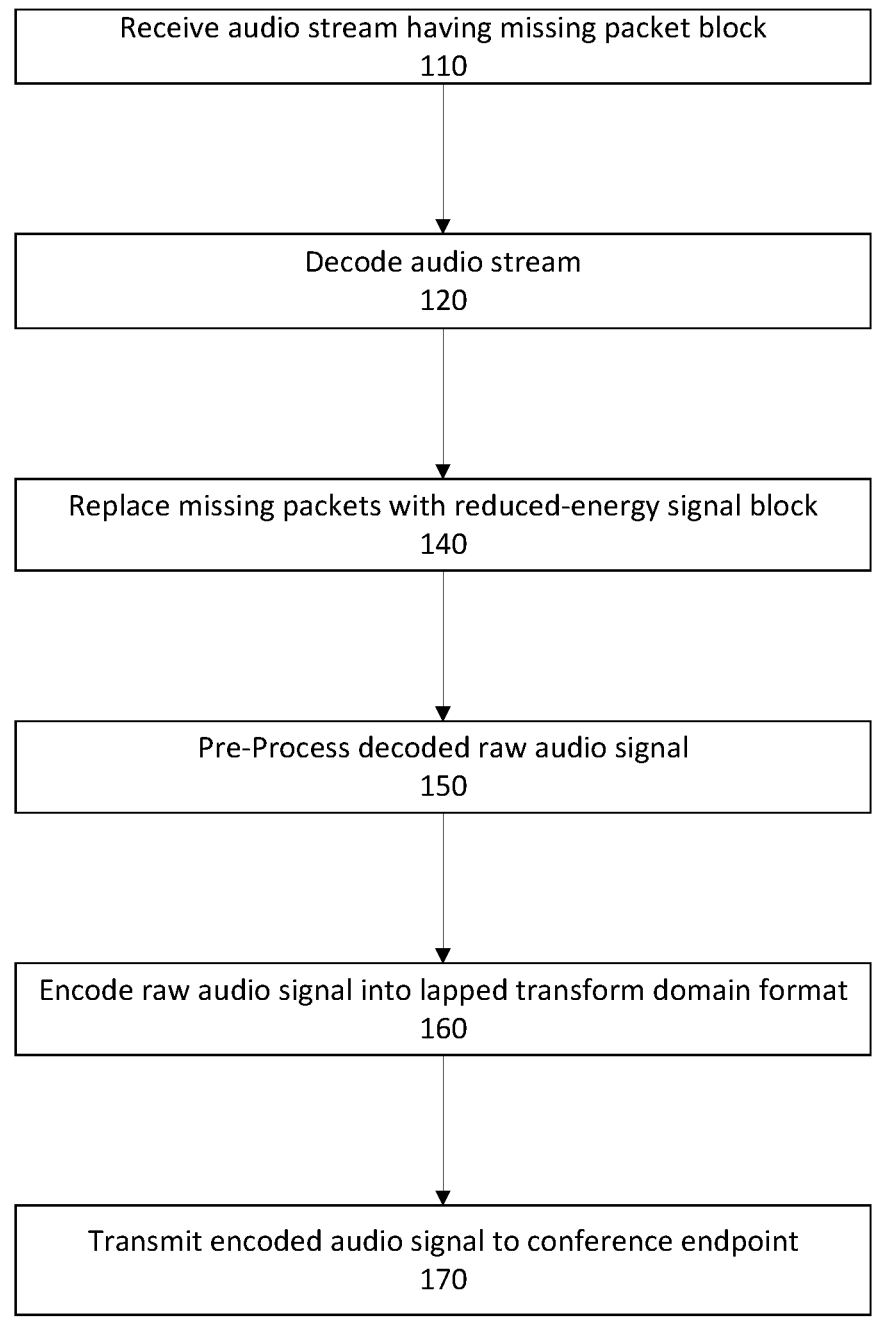
FIG. 1 shows a flow diagram for a method for reducing audio distortion resulting from a loss of audio data packets for signals transcoded to a lapped-transform domain signal, according to an embodiment.

Voice over IP (VoIP)-based communication systems, like Dolby Voice (developed by Dolby Laboratories, Inc. of California, United States of America), generally transmit audio signals as a series of packets. Each packet contains a small portion of the audio signal (typically 20 milliseconds). A common issue in VoIP-based systems is that some packets do not reach their destination on time or even at all (e.g. due to poor network connection between a meeting participant and the back-end conferencing system server). This results in gaps or blanks in the received audio signal that may sound highly annoying to a listener. Loss concealment may be defined as a signal processing step to reduce the perceived distortion caused by losses/errors/interruptions during transmission. To fill the blanks caused by lost packets, packet loss concealment may be used to replace lost packets with a made-up signal to make them less conspicuous to the listener. The made-up signal is usually computed such as to sound similar to the received speech packets immediately preceding the lost packets, with a smooth transition added.

Some audio conferencing systems (such as Dolby Voice) may use a signal representation known as the lapped transform domain that allows for packet loss concealment at a very low computational cost. The lapped transform domain (also known as the soft overlap transform domain) format may be a type of audio format that stores the signal in a sequence of short blocks with frequency-domain information, where each block overlaps with part of the previous and part of the following block's signal. Lapped transforms are often used where there may be changes to signal switching, routing, delay and mixing. The soft overlap of blocks provides a cross fade or somewhat smoothed boundary between blocks, even should any packet go missing or be interchanged in streaming and rendering. Lapped transforms are also commonly deployed in audio coding where each windowed frame of audio is suitable for analysis and coding in some frequency domain representation. This type of format is used in Dolby Voice, MP3, or AC4, for example. Audio conferencing systems that use a lapped transform domain format may allow participants to connect both using the endpoints that transmit signals in a lapped transform domain format, as well as through landline, cellular or other types of connections that transmit signals in other formats (e.g., non-overlapping time blocks). The server of the audio conferencing system transforms speech signals that are received from the latter, non-lapped endpoints to the lapped transform domain format. Non-lapped transform domain endpoints of a voice communications system may use formats that require more computationally-expensive methods for loss concealment, generally performed by the audio conferencing system upon receiving an audio signal from the endpoint. The conventional solution to packet loss when a non-lapped transform domain signal is received is to decode the received data to a raw audio signal, perform loss concealment as part of the decoding process or as an additional step, and then convert the resulting signal to the desired signal format (e.g., Dolby Voice), i.e., to perform loss concealment and format conversion in two separate steps.

The present invention seeks to maintain the low computational cost advantage of using a lapped transform domain signal format for non-lapped transform domain formatted audio signals received from endpoints connecting over a network to the audio conferencing system. It uses a modified signal flow where each lost packet is replaced (by silence or another low-energy signal) and marked for later concealment. The received signal may be preprocessed such that the beginnings and ends of lost packet blocks line up in a specific way with the positions of lapped transform domain windows. This preprocessing step may help avoid audible distortions at the transitions between speech and lost packets. The preprocessed signal is then transformed to the soft overlap transform domain, where the lost packets can be concealed through low-complexity techniques that exploit the soft overlap and other mathematical properties of the lapped transform domain. Silence insertion alone may create abrupt transitions between the audio signal and lost packets in the signal. This results in clicks or "pops" that may remain audible even after the loss concealment step. The preprocessing step before the conversion step may help to avoid this.

Once the signal is represented in the lapped transform format, the previously marked transform windows in it can be concealed at a lower computational cost. The combination of all steps provides a complete system for low-complexity, yet high quality packet loss concealment and audio format conversion. The method is designed to minimize the complexity of computations performed at the server. Low complexity is a key requirement to provide the efficiency and associated high scalability of the Dolby Voice server. The disclosed solution stands above conventional solutions in that it does not treat loss concealment as a separate process, but rather combines it with the audio format conversion step to yield a complete system that offers both high quality and low complexity.

Figure 2:
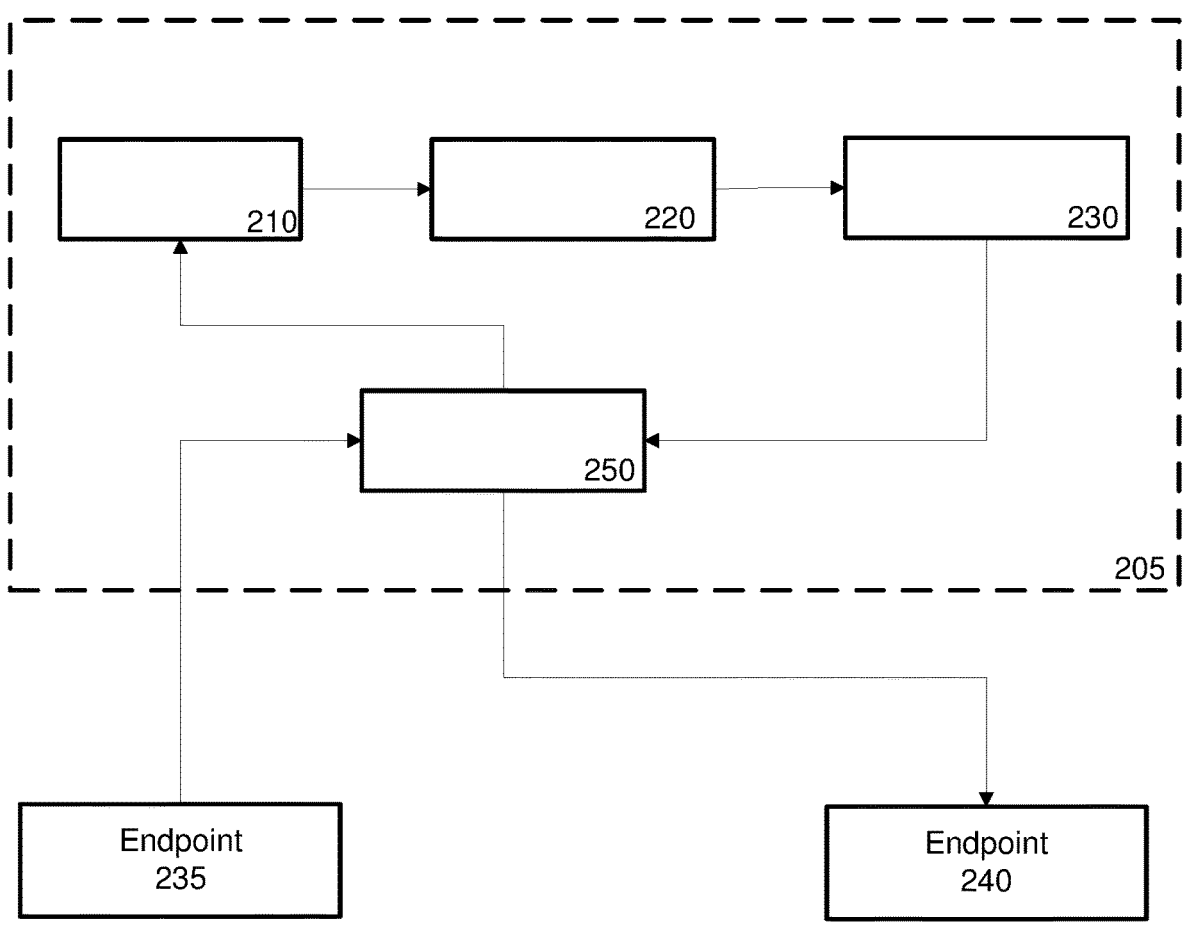
FIG. 2 shows a simplified block diagram of a system for reducing audio distortion resulting from a loss of audio data packets for signals transcoded to a lapped-transform domain signal, according to an embodiment.

A method for improving the end-to-end transport of low-latency audio signals over a potentially lossy network is described herein. FIG. 1 shows a flow diagram for a method 100 for reducing audio distortion resulting from a loss of audio data packets for signals transcoded to a lapped-transform domain signal, according to an embodiment. FIG. 2 shows a simplified block diagram of a system 200 for reducing audio distortion resulting from a loss of audio data packets for signals transcoded to a lapped-transform domain signal, according to an embodiment, using the method 100 described in FIG. 1. The exemplary system 200 includes an audio conferencing server 205 in communication with multiple endpoints 235 and 240. The audio conferencing server 205 may include communications transceiver 250, decoder 210, preprocessor 220, and encoder 230. While exemplary voice communication system 200 is shown as having a single server 205, the invention is not limited in this regard. In some embodiments, the voice communication system 200 may include a plurality of servers. For example, a first server may receive the packets of the audio stream and perform some processing (e.g., arranging the packets in sequence, when they are received out of order). A second server may perform decoding steps, and transmit the received raw audio signal and sideband information (e.g., received window sizes, the location of the missing packets in the sequence) to a third server, which may perform the pre-processing steps and encoding steps of method 100.

The method 100 may start at step 110, where the server of a voice-over internet protocol teleconference system 205 may receive packets of an audio stream over a network connection from an endpoint 235 that transmits audio in a non-lapped transform domain format. The packets may have a sequential order (e.g. a chronological order), where a block of packets that includes at least one packet is missing in the sequence. The packets may be received in the sequential order, or may be received out of order and may be reordered by the server prior to decoding. Each packet may have a received window size of a predetermined time duration (e.g., 20 ms); however, the received window size may change over time to a different time duration (i.e. the received window size of each packet of the audio stream may not be the same, due to the endpoint 235 choosing different window sizes for different kinds of audio signals, for example). The received packets may be in a first audio encoding format involving primarily a temporal block-based coding design, where time-domain samples are coded directly or in some compressed or predicted form in many cases (e.g., mobile devices, land-line signals, and the like).

Because the packets have been encoded into a format suited for transmission, they are decoded into a raw audio signal so they may be subsequently encoded into the lapped transform domain format. The server may therefore decode the received packets from the non-lapped format to a raw audio signal at step 120. The decoding may be performed by the decoder 210, which receives the audio stream from the communications transceiver 250. In addition to decoding the received audio packets, the decoder 210 may replace each missing packet in the sequence at step 140. In an exemplary embodiment, the missing packets may be replaced by blocks of silence; however, any suitable low-energy signal may be used to replace the missing packets. In some embodiments, the decoder 210 may be modified from ordinary operation to remove any form or attempt of removing discontinuities in the event of packet loss. By deactivating any decoder-based loss concealment, the CPU load may be reduced for the server 205, since decoder-based loss concealment may generally be higher complexity than the packet loss concealment performed subsequently in method 100 (see below).

The server 205 may then preprocess the decoded audio stream at step 150, by using the preprocessor 220, for example. After the preprocessing, the server 205 may encode the raw audio signal into transform windows having the lapped transform domain format at step 160 using encoder 230, which may also perform packet loss concealment in some embodiments. While the preprocessor 220 and the encoder 230 are shown as separate in server 205, some or all preprocessing steps may be executed by the encoder 230, which may be modified from a standard lapped transform domain format encoder to perform such steps. Preprocessing, conversion to the lapped transform domain, and the packet loss concealment are explained in greater detail in FIGS. 3 and 4 and the accompanying text below.

Figure 3A:
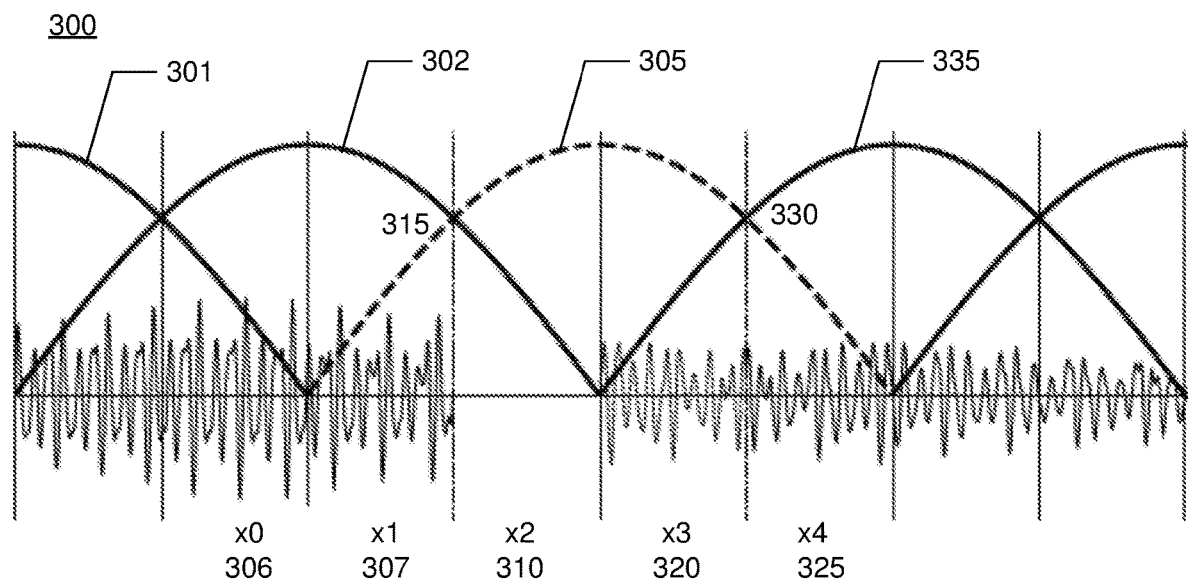
FIGS. 3A-B show plots of sequences of blocks of a decoded raw audio stream that include missing packets and modifications of a reduced-energy signal block, according to various embodiments.
Figure 3B:
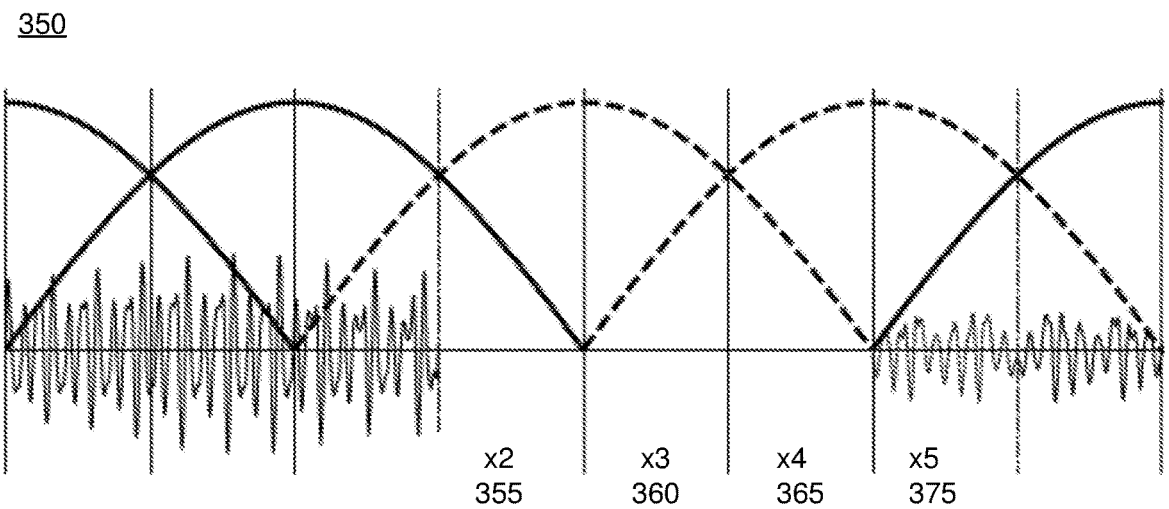
Figure 4:
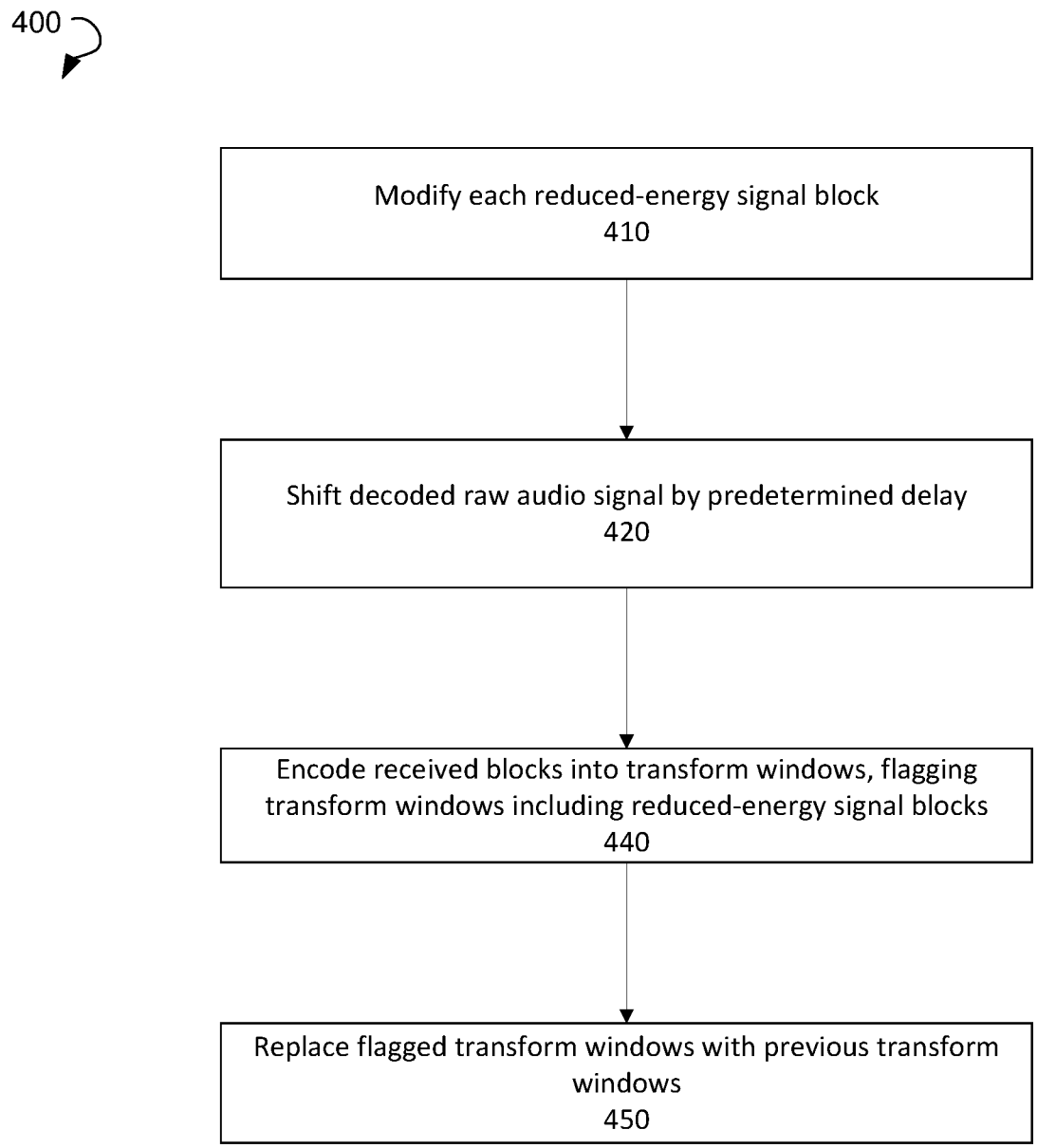
FIG. 4 shows a flow diagram for a method of pre-processing and encoding a received raw audio stream, where the encoding includes packet loss concealment, according to an embodiment.

FIGS. 3A-B show plots of sequences of blocks of a decoded raw audio stream that include missing packets and modifications of a reduced-energy signal block, according to various embodiments. Again, while the reduced-energy signal blocks of FIGS. 3A-B are shown as blocks of silence, any suitable substitute block having lower energy (to be clearly distinguishable from the received raw audio signal) may be used to replace missing packets. From FIG. 3A, x0 through x4 of plot 300 denote signal segments that have ¼ the length of the transform window size (in the exemplary embodiment, the segments have a duration of 10 ms). Plot 300 shows a single lost packet (having a window size of 20 ms, in the exemplary embodiment, which equals two segments in plot 300) replaced by a block of silence (at x2 310 and x3 320), although the same steps can be applied to consecutive lost packets as well. FIG. 4 shows a flow diagram for a method 400 of pre-processing and encoding a received raw audio stream, where the encoding includes packet loss concealment, according to an embodiment. In method 400, steps 410 and 420 represent an embodiment of the preprocessing performed prior to encoding the raw audio stream into the lapped transform domain format (i.e. step 150 of method 100). Steps 440 and 450 are embodiments of encoding the raw audio stream and performing packet loss concealment (e.g. at step 160 of method 100).

The preprocessor 220 may modify each block of silence at one of a beginning boundary and an ending boundary at step 410 as part of the preprocessing to ease the transition between speech and silence. Segments x2 310 and x3 320 make up a single 20 ms block of silence bounded by beginning boundary 315 and ending boundary 330. As shown in FIG. 3A, a modified signal has been inserted at the ending boundary 330 of the inserted segment of silence x3 320. The modified signal may include a set of synthesized audio samples based on received raw audio samples from an adjacent block to the block of silence.

The synthesized audio samples may be derived using several different techniques. As done in the embodiment shown in plot 300, the last portion of each inserted silence may be replaced by a time-reversed copy of the signal following immediately after the silence (i.e., segment x3 320=segment x4_reversed, the time-reversed version of the audio samples in the beginning of segment x4 325). In general, the use of time-reversed copies of adjacent signal portions ties in with mathematical properties of the lapped transform domain to improve the smoothness of the transition between silence and signal playback. The length of that portion may be of any desired duration; the embodiment of plot 300 shows a portion equal to ¼ of the length of the transform window 335 that includes the end boundary of the block of silence (between segments x3 320 and x4 325). An alternative embodiment of step 410 may be to replace the first portion of each inserted silence by a time-reversed copy of the signal immediately preceding the silence (i.e., replacing x2 310=x1_reversed, a time-reversed copy of the raw audio signal in segment x1 307). In yet another alternative embodiment, a portion of segment x2 310 may be replaced by a modified signal represented as g*(x0-x1_reversed), where g is the gain or attenuation factor used in the later loss concealment step (derived from a shape of one or more window functions of the lapped transform domain format). Replacing segment x2 310 with the expression g*(x0-x1_reversed) may allow for a better preservation of the signal in x1 (immediately before the silence), which may otherwise be slightly distorted in the later loss concealment step. In yet another embodiment, the modification may include modifying the block of silence at both the beginning boundary and the ending boundary (e.g., by adding a reversed version of the audio signal in an adjacent block to the corresponding portions of the block of silence). Finally, the synthesizing audio samples may include one or more of dithering, decorrelating, and stochastic processing to reduce correlation and potential artifacts caused by the overlapping coding strategy of the lapped transform domain format.

At step 420, the preprocessor 220 may shift the raw audio signal by a predetermined delay such that a start and end of each block of missing packets does not coincide with a peak of a transform window of a lapped transform domain format. In the lapped transform domain, the audio signal may be represented as a series of blocks, where the signal in each block overlaps with part of the signal in the preceding and part of the signal in the following block. This may be seen in plot 300, where overlapping curves (e.g. curves 305 and 335) indicate the placement of transform windows (of 40 ms length, in the exemplary embodiment) for conversion to the lapped transform domain. While in many embodiments the received window size is different from the transform window size, this is not necessarily always the case. The plot 350 in FIG. 3B shows a decoded raw audio signal having a received window size of 40 ms (stretching from segment x2 355 to segment x5 375), the same as the transform window size.

In the lapped transform domain format, audio samples of the raw audio signal at the edge of a transform window are stored with a lower gain than those located at the center of a transform window. This is clearly shown in plot 300 by the height of the transform windows, which peaks at the center of the transform window. The goal of step 420 is to delay the raw audio signal such that the transitions between speech blocks and inserted silence blocks are not stored at maximum gain in any block. In plot 300, the transition points 315 and 330 have been shifted to not coincide with either of the centers of the transform windows 302 and 335 that include the transition points. In various embodiments, the temporal alignment of the received raw audio signal may be shifted by ¼ the transform window size. This advantageously shares the impact on the initial and final transform windows occurring near the lost packet in the sequence of the audio stream. In an exemplary embodiment, the transform windows surrounding an inserted silence are placed such that they either precede or follow the silence transition point by ¼ of the transform window length. Again plot 300 demonstrates this principle; the transform window is 40 ms and the received window size of the audio signal is 20 ms, as the size of the transform window may frequently be different from the received window size. By shifting the audio signal by a predetermined delay of ¼ window length (10 ms), the start and end of the block of missing packets do not coincide with the centers of the transform windows 302 and 335.

There can be special cases depending on the combination of received window size and transform window size. Ideally, the received window size is an integer multiple of ½ the transform window size, e.g., if the transform window size is 40 ms, the received window size is ideally 20, 40, 60 ms etc. In some cases, if the received window is received at an optimal timing, no shift may be needed to align the received windows such that the start and the received windows do not coincide with the centers of the transform windows. However, even when the received window is the same size as the transform window, a shift is commonly necessary to meet the condition that the start and end of the received windows do not coincide with the centers of the transform windows. However, if, for example, the received window has a duration of 25 ms and the transform window is 40 ms, then there is no shifting that will optimally align both the start AND the end boundary of missing received packets (the optimal alignment would be for the start boundary to be at ¾ of the preceding "good" transform window, and the end boundary to be ¼ into the next "good" transform window), so a sub-optimal shift is selected that ensures that the start and end of the block of missing packets does not coincide with a peak of a transform window. Also, shifting may not be necessary for some lost packets (e.g., when the received window size is an integer multiple of ½ the transform window size, and the transform windows have been aligned optimally since the first received window in the received audio stream). However, in some cases the received window size may change over time (as previously noted), the transform window size may change over time, or the received audio stream may cease and resume whenever the remote participant stops and resumes speaking. Any of these cases may change the alignment between received and transform windows, and therefore require shifting the audio signal again to ensure optimal alignment.

After the shifting, the server may encode the raw audio signal into transform windows having the lapped transform domain format at step 440. Packet loss concealment may be performed for each transform window of the encoded audio signal that includes a modified reduced-energy signal block. To do so, in an embodiment, transform windows that are centered over a reduced-energy signal block (e.g., window 305, which includes a block of silence) may not be encoded. Instead, these windows may be marked for loss concealment at step 440.

The loss concealment step may, in some embodiments, be carried out after conversion of the signal to the lapped transform domain at step 450. The loss concealment may be implemented by replacing any previously marked window (s) (including selected window 305) with copies of the preceding windows, i.e., by repeating previous "good" windows. This is a loss concealment method with very low computational cost that exploits the soft overlap of transform windows in the lapped transform domain to provide smooth transitions between windows. While method 400 shows loss concealment being performed by the server, prior to transmission, the invention is not limited in this regard. That is, in some embodiments, packet loss concealment may be performed by the endpoint after receiving the transmitted audio stream. A decoder of a receiving endpoint may, for example, receive the previously-marked windows and replace the marked windows with preceding windows. In this way, the packet loss may be partially propagated, and then some of the logic of packet loss looping or insertion of repeat MDCT frames happens at the other end. In some embodiments, where the block of packets includes multiple lost packets, a first transform window of the block (window 305 in FIG. 3A) may be created using packet loss concealment by the server. For the remainder of the block of missing packets, the server may stop sending any encoded transform windows until a last window including the block of missing packets, where a fade-in (such as transform window 335) is applied. If the flag or sequence number then at a receiver of the receiving endpoint sees the omitted transform windows from the encoded audio stream (from the server) as packet loss, the endpoint receiver may function as a conventional decoder, and do the efficient low cost packet loss concealment on the received encoded audio stream. In some embodiments, even the first transform window of the block of missing packets may be omitted, as well as every other transform window including the block of missing packets, until the fade-in (e.g., transform window 335) is encoded and transmitted, again relying on the conventional packet loss concealment of the receiver of the endpoint to repeat the previous received transform windows. Performing packet loss concealment on the endpoint, rather than the server, may advantageously further move computational load away from the server to the endpoints, allowing the server to process more audio streams simultaneously.

When multiple consecutive transform windows are replaced using loss concealment, several different approaches may be used. For example, one or more marked transform windows may be replaced by the immediately preceding window, i.e., window 305 is replaced by a copy of window 302 in plot 300. If the inserted silence spans multiple transform windows, the replacing transform window may be repeated multiple times (i.e., "302, 302, 302, . . . "). In an alternative embodiment for longer consecutive concealments, groups of two or more transform windows may be repeated as long as needed, i.e., "301, 302, 301, 302, 301, 302, . . . " Repeating two or more transform windows may reduce potential artifacts that may occur with multiple repetitions of the same window, as the extended time between the looping of the transform windows may lead to a greater likelihood of decorrelated audio at the point of joining the looped transform windows. Having decorrelated audio may reduce the chances of constructive or destructive interference dominating the transition boundary between the last transform window of the looped sequence and the first transform window of the repeated group. Also, in an exemplary embodiment, transform windows may be repeated with a steadily decreasing gain e.g., eventually fading to silence for longer consecutive concealments.

Other approaches may be used to replace the missing transform windows when the block of missing packets affects multiple transform windows in an encoded stream, based on the idea that decorrelation at transitions between repeat windows and received signal windows is preferable. For example, suppose four transform windows prior to the block of missing packets are labeled "A, B, C, D," and A' indicates a time-reversed copy of transform window A. A possible sequence for a longer block of missing packets may be indicated as "A B C D C' B' A' C' B' A'," where the loop runs backwards. Sequences like this (or similar sequences such as "A B C D D C D B C D . . . ") may be advantageous to account for blocks of missing packets having an unknown or indefinite length. Another potential sequence for such blocks of missing packets may be a stochastic reverby fade away, expressed as:

A B C D D* C* D B C* D* A** B C**
D*** B** C** D** C*****
D******* 0;

Where the "*" represent a decorrelated version of a previous indicated transform window that also has a 2 dB decay.

Returning to FIGS. 1 and 2, after packet loss concealment has been performed, the server 205 may transmit the encoded audio signal at step 170 to a recipient endpoint 240. The modified transform-domain signal may be transmitted by communications transceiver 250 to the recipient endpoint 240, where it may be decoded (i.e., converted to raw audio) for playback. Lapped transform domain decoders of the endpoint 240 may use the soft overlapping windows shown in FIG. 3 to perform the inverse transform (i.e., decoding) to a raw audio signal. The soft overlap results in a smooth transition between original and concealed speech blocks, leading to high perceptual quality playback despite the packet loss from the initial transmission of the audio signal by endpoint 235. In an exemplary embodiment, additional metadata may be included by the encoder 230 identifying presence of data that has been synthesized using packet loss concealment. This may facilitate downstream decisions regarding decoding, rendering, and/or use of retransmitted data to further reduce the perceptual impact of the discontinuity in some embodiments.

While method 100 shows that the encoded audio signal is transmitted after being encoded, this is not required. In some embodiments, after packet loss concealment has been performed, the encoded audio signal is stored on the server 205, for playback or transmission at a later time. For example, server 205 may be a recording server for meeting minutes that can be accessed at a later time, or further processed on the server (e.g., automatic speech-to-text transcription).

In conventional solutions to the problem of dealing with packet loss for non-lapped transform domain-formatted audio, the steps of initially decoding incoming packets to PCM (i.e., a raw digital audio signal in a time domain format) and the subsequent encoding to the target domain are generally treated as separate problems, and therefore optimized and achieved with different goals and constraints that may not reflect those of this system design, or take advantage of the particular nature of the decode and encode presented. Notably, as described above the soft overlap used in the second step of encoding is used to help conceal any gaps in the received signal, and at the same time the highly lightweight and computationally efficient case of the first step of decoding the non-transform domain codec may be used for packet concealment.

Conventional packet loss solutions teach the compartmentalization of these two processes—the decode and encode—which when combined together in the best known prior art are computationally expensive and can create a worse perceptual result than the present invention. The following lists some known prior art for the compartmentalized packet loss concealment of the initial decode, and briefly details the deficiencies and suboptimality issues of that approach.

Packet loss concealment ("PLC") extension, and onset prediction for a PCM signal can be accomplished via the use of predictive models such as LPC, ARMA, auto-regressive modeling and convolutional filtering. The analysis stages of these approaches are very computationally expensive and tend to suffer from the following challenges: they are only useful for short sections of loss, generally less than the size (>20 ms) of losses in the audio conferencing context, when extended these approaches can sound very melodic, as spurious short tones can be extended well beyond their natural length, and such approaches are numerically posed, but often perceptually challenged for creating the onset softening samples, and a transform based reversal is often superior.

A first class of conventional time-domain decoders includes forms of PCM mapping (International Telecommunication Union speech coding standard G.711), simple ADPCM (e.g., speech coding standard G.722) or more complex linear predictive models like CELP and ACELP (e.g., speech coding standards G.729, G.722.2). All International Telecommunication Union speech coding standards cited herein are incorporated by reference. While it is known that a transform-based softening of the PLC boundaries can be effective, this first class of conventional decoders are not transform domain-based, and significant computational complexity would be added by converting the time-domain decoders listed above just to take advantage of transform-based PLC. In the present invention however, the succession of the decode/encode process is designed as a system. Therefore, the cost of the transform is amortized or fixed in the encoder, and through this invention the transform-domain is effectively utilized to achieve a PLC on the decoded signal.

Due to the combined design, and to achieve the efficiency goal, the intermediate PLC'd PCM signal is never actually present in the combined decode/encode process. This is a clear indication of the joint design and optimization and sets it apart from any prior art, where the goal and design would be to clearly construct a PLC'd version of the signal prior to encoding. The fully gap-concealed version of the signal is not present until the final decode of the transform-based codec in use—in effect the computational complexity of the packet loss concealment is shifted from occurring in the input decode, to being spread across the encode and final decode of the audio. This is of significant advantage where, as described, the transcoding or combined decode/encode process is occurring on a central processing resource (i.e., the Dolby Voice server).

Since the intermediate PLC'd PCM signal is not created, it does not make sense in the present approach to individually test the performance of the decoder and encoder. It is taught in prior art often that the best result comes from ensuring high performance of the individual codecs—encode to decode of the PCM-style codec and PLC, and encode to decode of the second transform-based codec and PLC. This is not possible with the present work, rather we seek to implement and test PLC across the entire system, which will include two audio codecs and two potential locations of packet loss. As presented though, the optimization of the concatenated and full dual codec transport can achieve the required perceptual performance and better computational complexity. Testing and optimizing the performance of the separate codecs, when they will always be concatenated, is neither necessary nor sufficient to achieve the globally optimized solution.

While the solutions described herein for concealing packet loss are in the context of audio streams and a voice communications system, other embodiments are contemplated. Any context where transcoding is used for received data streams may utilize the systems and methods described herein to efficiently conceal packet loss over a network connection.

Figure 5:
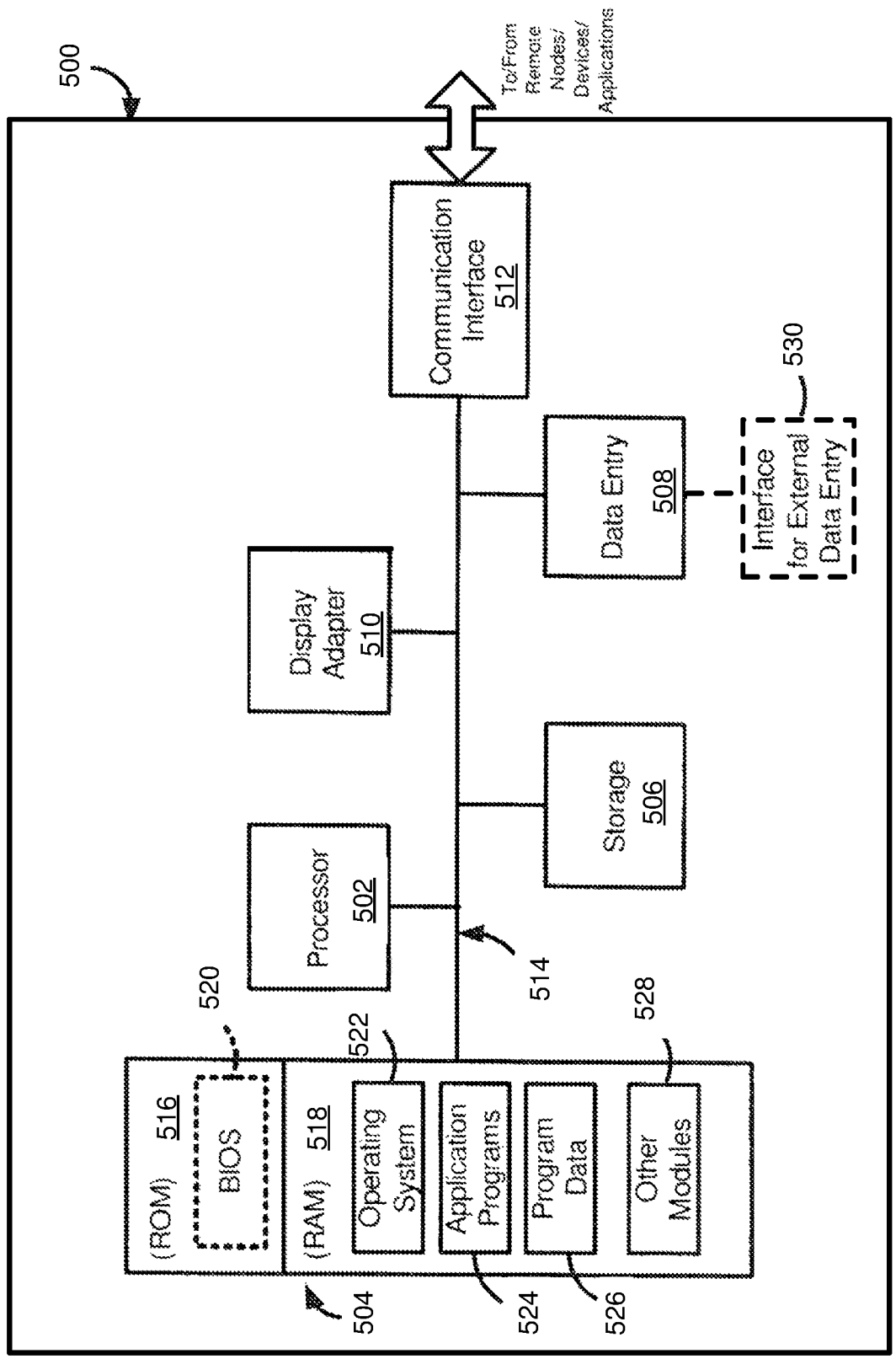
FIG. 5 is a block diagram of an exemplary system for reducing audio distortion resulting from a loss of audio data packets for signals transcoded to a lapped-transform domain signal, according to an embodiment.

The methods and modules described above may be implemented using hardware or software running on a computing system. FIG. 5 is a block diagram of an exemplary computing system for concealing packet loss in a multi-format voice communication system, according to various embodiments of the present invention. With reference to FIG. 5, an exemplary system for implementing the subject matter disclosed herein, including the methods described above, includes a hardware device 500, including a processing unit 502, memory 504, storage 506, data entry module 508, display adapter 510, communication interface 512, and a bus 514 that couples elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in memory 504 and/or storage 506 and/or received via data entry module 508.

The memory 504 may include read only memory (ROM) 516 and random access memory (RAM) 518. Memory 504 may be configured to store program instructions and data during operation of device 500. In various embodiments, memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 504 may also include nonvolatile memory technologies such as nonvolatile flash RAM (NVRAM) or ROM. In some embodiments, it is contemplated that memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, ROM 516 or RAM 518, including an operating system 522, one or more applications programs 524, program data 526, and other program modules 528. A user may enter commands and information into the hardware device 500 through data entry module 508. Data entry module 508 may include mechanisms such as a keyboard, a touch screen, a pointing device, etc. Other external input devices (not shown) are connected to the hardware device 500 via external data entry interface 530. By way of example and not limitation, external input devices may include a microphone, joystick, game pad, satellite dish, scanner, or the like. In some embodiments, external input devices may include video or audio input devices such as a video camera, a still camera, etc. Data entry module 508 may be configured to receive input from one or more users of device 500 and to deliver such input to processing unit 502 and/or memory 504 via bus 514.

The hardware device 500 may operate in a networked environment using logical connections to one or more remote nodes (not shown) via communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 512 may include logic configured to support direct memory access (DMA) transfers between memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of hardware device 500 illustrated in FIG. 5 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 500. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

Various aspects of the present invention may be appreciated from the following enumerated example embodiments (EEEs):

EEE 1. A method for concealing packet loss in a received audio stream, the method comprising:
  receiving, by an audio communication system comprising one or more servers, packets of an audio stream, the received audio stream being in a non-lapped transform domain format, the packets having a sequential order, where a block of packets is missing in the sequence, the block of packets including at least one packet, each packet of the audio stream having a received window size;
  decoding, by the audio communication system, the received packets to a sequence of blocks of a raw audio signal;
  replacing, by the audio communication system, each missing packet in the sequence with a reduced-energy signal block, whereby the sequence of blocks of the raw audio signal comprises at least one reduced-energy signal block, wherein the reduced-energy signal block has a lower energy in comparison to remaining blocks of the raw audio signal, such that the reduced-energy signal block is distinguishable from remaining blocks of the received raw audio signal;
  modifying, by the audio communication system, each reduced-energy signal block of the raw audio signal at one of a beginning boundary and an ending boundary;
  shifting, by the audio communication system, the raw audio signal by a predetermined delay such that a start and end of each reduced energy block of the raw audio signal does not coincide with a peak of a transform window of a lapped transform domain format;
  encoding, by the server, the raw audio signal into transform windows having the lapped transform domain format, wherein packet loss concealment is performed for a selected transform window of the encoded audio signal, the selected transform window having a modified reduced energy signal block located at a center portion; and
  transmitting, by the audio communication system, the encoded audio signal to an endpoint.

EEE 2. The method of EEE 1, where the packet loss concealment is performed by the voice communication system prior to the transmitting the encoded audio signal to the endpoint.

EEE 3. The method of EEE 1, where the packet loss concealment is performed at the endpoint after the transmitting the encoded audio signal.

EEE 4. The method of EEE 1, wherein the transmitted audio signal, when received by a listener endpoint, is decoded to output raw audio, the decoding comprising overlapping the transform window containing the packet loss concealment with adjacent transform windows containing received audio packets.

EEE 5. The method of EEE 1, the packet loss concealment comprising replacing the selected transform window that includes the modified reduced-energy signal block with a copy of a previous transform window of the encoded audio signal.

EEE 6. The method of EEE 5, the at least one missing packet including multiple consecutive packets in the sequence, where the copy of the previous transform window is used to replace each transform window that includes the missing multiple consecutive packets.

EEE 7. The method of EEE 5, the at least one missing packet including multiple consecutive packets in the sequence, where a copy of two transform windows preceding the multiple consecutive missing packets is used to replace one or more pairs of transform windows that include the multiple consecutive packets.

EEE 8. The method of EEE 5, the at least one missing packet including multiple consecutive packets in the sequence, where the selected transform window has a decreased gain compared to a previous transform window.

EEE 9. The method of EEE 1, the modifying each reduced-energy signal block comprising replacing a portion of each reduced-energy signal block near the ending boundary with a time-reversed copy of the raw audio signal packet immediately following each reduced-energy signal block.

EEE 10. The method of EEE 9, wherein the portion of each reduced-energy signal block has a duration of ¼ a length of the transform window size.

EEE. 11. The method of EEE 1, the modifying each reduced-energy signal block comprising replacing a portion of each reduced-energy signal block near the beginning boundary with a time-reversed copy of a raw audio signal packet immediately preceding each reduced-energy signal block.

EEE 12. The method of EEE 1, the modifying each reduced-energy signal block comprising replacing a portion of each reduced-energy signal block near the beginning boundary with a signal represented as g*(x0-x1_reversed), where g is a gain used in the packet loss concealment, x0 is a raw audio signal segment, having ¼ the transform window length, occurring ½ the transform window length before the block of silence, and x1_reversed is a time-reversed copy of a raw audio signal segment, having ¼ the transform window length, immediately preceding the reduced-energy signal block.

EEE 13. The method of EEE 1, wherein each transform window of the lapped transform domain format comprises a plurality of audio samples, audio samples near boundaries of each transform window being encoded with a lower gain than audio samples near a center of each transform window.

EEE 14. The method of EEE 1, the received audio stream being in a temporal block-based format.

EEE 15. The method of EEE 1, the performing packet loss concealment further comprising at least one of dithering, decorrelation, and stochastic processing to reduce correlation and potential artifacts due to the encoding into the lapped transform domain format.

EEE 16. The method of EEE 1, where the encoding the raw audio signal further comprises generating metadata to identify the presence of transform windows that include packet loss concealment-generated data, the method further comprising transmitting the generated metadata for downstream decisions about decoding or rendering the encoded audio signal.

EEE 17. A computer program product comprising computer-readable program code to be executed by one or more processors when retrieved from a non-transitory computer-readable medium, the program code including instructions to:

receive packets of an audio stream, the received audio stream being in a non-lapped transform domain format, the packets having a sequential order, where at least one packet is missing in the sequence, each packet having a received window size;

decode the received packets to a sequence of blocks of a raw audio signal;

replace each missing packet in the sequence with a reduced-energy signal block, whereby the sequence of blocks of the raw audio signal comprises at least one reduced-energy signal block, wherein the reduced-energy signal block has a lower energy in comparison to remaining blocks of the raw audio signal, such that the reduced-energy signal block is distinguishable from remaining blocks of the received raw audio signal;

modify each reduced-energy signal block of the raw audio signal at one of a beginning boundary and an ending boundary of the inserted blocks;

shift the raw audio signal by a predetermined delay such that a start and end of each reduced energy block of the raw audio signal does not coincide with a peak of a transform window of a lapped transform domain format;

encode the raw audio signal into transform windows having the lapped transform domain format, packet loss concealment being performed for a selected transform window, of the encoded audio signal, having a modified reduced energy signal block located at a center portion of the selected transform window; and transmit the encoded audio signal.

EEE 18. A system for concealing packet loss in a received audio stream, the system comprising:

a communications transceiver that receives packets of an audio stream, the received audio stream being in a non-lapped transform domain format, the packets having a sequential order, where at least one packet is missing in the sequence, each packet having a received window size;

a decoder that decodes the received packets from the non-lapped format to a sequence of blocks of a raw audio signal and replaces each missing packet in the sequence with a reduced-energy signal block, whereby the sequence of blocks of the raw audio signal comprises at least one reduced-energy signal block, wherein the reduced-energy signal block has a lower energy in comparison to remaining blocks of the raw audio signal, such that the reduced-energy signal block is distinguishable from remaining blocks of the received raw audio signal;

a preprocessor that modifies each reduced-energy signal block of the raw audio signal at one of a beginning boundary and an ending boundary of the blocks of silence and shifts the raw audio signal by a predetermined delay such that a start and end of each energy reduced block of the raw audio signal does not coincide with a peak of a transform window of a lapped transform domain format; and an encoder that encodes the raw audio signal into transform windows having the lapped transform domain format, the communications transceiver transmitting the encoded audio signal to one or more endpoints, packet loss concealment being performed for a selected transform window, of the encoded audio signal, having a modified reduced energy signal block located at a center portion of the selected transform window.

EEE 19. The system of EEE 18, the encoder encoding blocks of the raw audio signal that include audio samples and marking any transform window, including the selected transform window, that includes reduced-energy signal blocks for replacement, the packet loss concealment comprising replacing, by the encoder or by the one or more endpoints, the marked transform windows with copies of previous transform windows of the encoded audio signal.

EEE 20. The system of EEE 18, the decoder being modified to not attempt to compensate for any detected missing packets in the received audio stream.

EEE 21. The system of EEE 18, the preprocessor being a part of the encoder, where the preprocessor receives the received window size of the audio stream as a sideband communication from the decoder and determines the predetermined delay based on the received window size and the transform window, the predetermined delay being determined such that the start and end of each block of the audio stream does not coincide with a center of the transform window.

EEE 22. The system of EEE 18, where the reduced-energy signal block is a block of silence.

What is claimed is:

1. A method for concealing packet loss in a received audio stream, the method comprising:

receiving, by an audio communication system comprising one or more servers, packets of an audio stream, the received audio stream being in a non-lapped transform domain format, the packets having a sequential order, where a block of packets is missing in the sequence, the block of packets including at least one packet, each packet of the audio stream having a received window size;

decoding, by the audio communication system, the received packets to a sequence of blocks of a raw audio signal;

replacing, by the audio communication system, each missing packet in the sequence with a reduced-energy signal block, whereby the sequence of blocks of the raw audio signal comprises at least one reduced-energy signal block, wherein the reduced-energy signal block has a lower energy in comparison to remaining blocks of the raw audio signal, such that the reduced-energy signal block is distinguishable from remaining blocks of the received raw audio signal;

modifying, by the audio communication system, each reduced-energy signal block of the raw audio signal at one of a beginning boundary and an ending boundary;

shifting, by the audio communication system, the raw audio signal by a predetermined delay such that a start and end of each reduced energy block of the raw audio signal does not coincide with a peak of a transform window of a lapped transform domain format;

encoding, by the server, the raw audio signal into transform windows having the lapped transform domain format, wherein packet loss concealment is performed for a selected transform window of the encoded audio signal, the selected transform window having a modified reduced energy signal block located at a center portion; and transmitting, by the audio communication system, the encoded audio signal to an endpoint.

2. The method of claim 1, wherein the transmitted audio signal, when received by a listener endpoint, is decoded to output raw audio, the decoding comprising overlapping the transform window containing the packet loss concealment with adjacent transform windows containing received audio packets.

3. The method of claim 1, the packet loss concealment comprising replacing the selected transform window that includes the modified reduced-energy signal block with a copy of a previous transform window of the encoded audio signal.

4. The method of claim 3, the at least one missing packet including multiple consecutive packets in the sequence, where the copy of the previous transform window is used to replace each transform window that includes the missing multiple consecutive packets.

5. The method of claim 3, the at least one missing packet including multiple consecutive packets in the sequence, where a copy of two transform windows preceding the multiple consecutive missing packets is used to replace one or more pairs of transform windows that include the multiple consecutive packets.

6. The method of claim 3, the at least one missing packet including multiple consecutive packets in the sequence, where the selected transform window has a decreased gain compared to a previous transform window.

7. The method of claim 1, the modifying each reduced-energy signal block comprising replacing a portion of each reduced-energy signal block near the ending boundary with a time-reversed copy of the raw audio signal packet immediately following each reduced-energy signal block.

8. The method of claim 7, wherein the portion of each reduced-energy signal block has a duration of 1/4 a length of a transform window size.

9. The method of claim 1, the modifying each reduced-energy signal block comprising replacing a portion of each reduced-energy signal block near the beginning boundary with a time-reversed copy of a raw audio signal packet immediately preceding each reduced-energy signal block.

10. The method of claim 1, the modifying each reduced-energy signal block comprising replacing a portion of each reduced-energy signal block near the beginning boundary with a signal represented as $g*(x0-x1\_reversed)$, where g is a gain used in the packet loss concealment, $x0$ is a raw audio signal segment, having 1/4 of a transform window length, occurring 1/2 the transform window length before the block of silence, and $x1\_reversed$ is a time-reversed copy of a raw audio signal segment, having 1/4 the transform window length, immediately preceding the reduced-energy signal block.

11. The method of claim 1, wherein each transform window of the lapped transform domain format comprises a plurality of audio samples, audio samples near boundaries of each transform window being encoded with a lower gain than audio samples near a center of each transform window.

12. The method of claim 1 the performing packet loss concealment further comprising at least one of dithering, decorrelation, and stochastic processing to reduce correlation and potential artifacts due to the encoding into the lapped transform domain format.

13. The method of claim 1, where the encoding the raw audio signal further comprises generating metadata to identify presence of transform windows that include packet loss concealment-generated data, the method further comprising transmitting the generated metadata for downstream decisions about decoding or rendering the encoded audio signal.

14. A computer program product comprising a non-transitory computer-readable medium storing computer-readable program code that, when executed by one or more processors, causes the one or more processors to perform operations comprising:

receiving packets of an audio stream, the received audio stream being in a non-lapped transform domain format, the packets having a sequential order, where at least one packet is missing in the sequence, each packet having a received window size;

decoding the received packets to a sequence of blocks of a raw audio signal;

replacing each missing packet in the sequence with a reduced-energy signal block, whereby the sequence of blocks of the raw audio signal comprises at least one reduced-energy signal block, wherein the reduced-energy signal block has a lower energy in comparison to remaining blocks of the raw audio signal, such that the reduced-energy signal block is distinguishable from remaining blocks of the received raw audio signal;

modifying each reduced-energy signal block of the raw audio signal at one of a beginning boundary and an ending boundary of inserted blocks;

shifting the raw audio signal by a predetermined delay such that a start and end of each reduced energy block of the raw audio signal does not coincide with a peak of a transform window of a lapped transform domain format;

encoding the raw audio signal into transform windows having the lapped transform domain format, packet loss concealment being performed for a selected transform window, of the encoded audio signal, having a modified reduced energy signal block located at a center portion of the selected transform window; and transmitting the encoded audio signal.

15. A system for concealing packet loss in a received audio stream, the system comprising:
a communications transceiver that receives packets of an audio stream, the received audio stream being in a non-lapped transform domain format, the packets having a sequential order, where at least one packet is missing in the sequence, each packet having a received window size;
a decoder that decodes the received packets from the non-lapped format to a sequence of blocks of a raw audio signal and replaces each missing packet in the sequence with a reduced-energy signal block, whereby the sequence of blocks of the raw audio signal comprises at least one reduced-energy signal block, wherein the reduced-energy signal block has a lower energy in comparison to remaining blocks of the raw audio signal, such that the reduced-energy signal block is distinguishable from remaining blocks of the received raw audio signal;
a preprocessor that modifies each reduced-energy signal block of the raw audio signal at one of a beginning boundary and an ending boundary of the blocks of silence and shifts the raw audio signal by a predetermined delay such that a start and end of each reduced energy block of the raw audio signal does not coincide with a peak of a transform window of a lapped transform domain format; and
an encoder that encodes the raw audio signal into transform windows having the lapped transform domain format, the communications transceiver transmitting the encoded audio signal to one or more endpoints, packet loss concealment being performed for a selected transform window, of the encoded audio signal, having a modified reduced energy signal block located at a center portion of the selected transform window.

16. The system of claim 15, the encoder encoding blocks of the raw audio signal that include audio samples and marking any transform window, including the selected transform window, that includes reduced-energy signal blocks for replacement, the packet loss concealment comprising replacing, by the encoder or by the one or more endpoints, the marked transform windows with copies of previous transform windows of the encoded audio signal.

17. The system of claim 15, the decoder being modified to not attempt to compensate for any detected missing packets in the received audio stream.

18. The system of claim 15, the preprocessor being a part of the encoder, where the preprocessor receives the received window size of the audio stream as a sideband communication from the decoder and determines the predetermined delay based on the received window size and the transform window, the predetermined delay being determined such that the start and end of each block of the audio stream does not coincide with a center of the transform window.

19. The system of claim 18, where the reduced-energy signal block is a block of silence.

* * * * *